United States Patent [19]  
Rasmussen

[11] Patent Number: 4,769,285  
[45] Date of Patent: Sep. 6, 1988

[54] POLYAMIDE-ACRYLATE BLENDS

[75] Inventor: Jerald K. Rasmussen, Stillwater, Minn.

[73] Assignee: Minnesota Mining and Manufacturing Company, St. Paul, Minn.

[21] Appl. No.: 66,132

[22] Filed: Jun. 24, 1987

Related U.S. Application Data

[62] Division of Ser. No. 758,044, Jul. 23, 1985, Pat. No. 4,696,965.

[51] Int. Cl.$^4$ ................................................ C09J 7/02
[52] U.S. Cl. ...................................... 428/355; 428/344; 428/474.4; 428/479.6
[58] Field of Search .................. 428/355, 343, 474.4, 428/479.6

[56]  References Cited

U.S. PATENT DOCUMENTS

| | | | |
|---|---|---|---|
| 2,884,126 | 4/1959 | Ulrich | 206/59 |
| 3,792,002 | 2/1974 | Krieger et al. | 260/18 |
| 3,845,163 | 10/1974 | Murch | 260/857 |
| 3,893,496 | 7/1975 | Wallace et al. | 151/14.5 |
| 4,018,733 | 4/1977 | Lopez et al. | 260/27 |
| 4,167,505 | 9/1979 | Dunkelberger | 260/37 |
| 4,370,380 | 1/1983 | Shah | 428/355 |
| 4,374,231 | 2/1983 | Doucet | 525/179 |
| 4,395,518 | 7/1983 | Giles, Jr. et al. | 525/180 |

FOREIGN PATENT DOCUMENTS 7105443  6/1982  Japan .

OTHER PUBLICATIONS

"The Condensed Chemical Dictionary", G. G. Hawley, 9th Ed., Van Nostrand Reinhold, N.Y., N.Y., 1977.
"Developments in Adhesives", D. W. Aubrey, W. C. Wake, Ed., Applied Science Publishers, London, England, vol. I, Chapter 5.
Encyclopedia of Polymer Sci. and Tech., D. E. Peerman, Wiley, N.Y., 1969, vol. 10, pp. 597–615.

*Primary Examiner*—Edith Buffalow  
*Attorney, Agent, or Firm*—Donald M. Sell; Mark A. Litman

[57] ABSTRACT

Pressure sensitive adhesives comprise blends of polyamides with polyacrylates. The resultant blends are partially suited for use in pressure sensitive adhesive tapes. Films, articles, and coated articles containing these pressure sensitive adhesives are also disclosed.

7 Claims, No Drawings

POLYAMIDE-ACRYLATE BLENDS

This is a division of application Ser. No. 758,044 filed July 23, 1985, now U.S. Pat. No. 4,696,965.

FIELD OF THE INVENTION

This invention relates to pressure sensitive adhesives comprising polymer blends of polyamides with polyacrylates. In another aspect, a method of preparing the pressure sensitive adhesives is disclosed. The pressure sensitive adhesives can be used as layers on substrates and in articles such as pressure sensitive adhesive tapes.

BACKGROUND OF THE INVENTION

Pressure sensitive adhesives are well known in the art. An "adhesive," as defined by C. G. Hawley in "The Condensed Chemical Dictionary," 9th Ed., Van Nostrand Reinhold, New York, N.Y., 1977, is "any substance, inorganic or organic, natural or synthetic, that is capable of bonding other substances together by surface attachment." A pressure sensitive adhesive (psa) is generally a component of a pressure sensitive tape which in its most simple configuration is composed of an adhesive and a backing. The overall construction is tacky and adherent at the use temperature (typically room temperature) and adheres to a variety of substrates using only moderate (typically fingertip) pressure to form the bond. In this fashion, pressure sensitive tapes constitute a complete, self-contained bonding system.

A good psa, according to D. W. Aubrey in "Developments in Adhesives," W. C. Wake, Ed., Applied Science Publishers, London, England, Vol. I, chapter 5, must fulfill three main technical requirements:
1. The adhesive must exhibit adequate resistance to shear under the influence of an applied load; this relates to the adhesives's *cohesion*.
2. The adhesive must conform quickly to the surface to which it is applied in order to rapidly form a bond; this relates to *tack*.
3. The adhesive must display adequate resistance to separation by peeling once the bond is formed; this requirement relates to *adhesion*.

These three requirements are assessed generally by means of tests which are designed to measure cohesion (shear holding power), tack, and adhesion (peel strength). These measurements taken together constitute the "balance of properties" often used to characterize psa's.

Homopolymers of long chain alkyl acrylates are quite tacky but lack the cohesive strength necessary to function as psa's having well-balanced properties. This deficiency may be overcome by copolymerization with polar monomers capable of interpolymeric dipole-dipole or hydrogen bonding interactions as disclosed in U.S. Pat. No. 2,884,126. Whereas this approach is adequate for some applications, further increases in cohesive strength is needed in the more demanding applications, such as those requiring load-bearing ability. It has been the common practice in the art to obtain this increased cohesion by crosslinking of the adhesive. Numerous methods have been described for crosslinking, and all of them suffer certain disadvantages (see Aubrey, op. cit., pp. 146-148). Therefore, it would be advantageous to have a simple method for improving cohesive strength without the need for crosslinking reactions with their attendant problems.

U.S. Pat. No. 4,370,380 teaches that certain pressure sensitive acrylic copolymers, which, because of their low molecular weights, do not have sufficient cohesive strengths to be satisfactory psa's by themselves, may be improved in cohesive strength by blending with 1-30% by weight of vinyllactam polymers or copolymers, such as polyvinylpyrrolidone.

Condensation-based polyamides, e.g. nylon, are well known in the art and in general are film- and fiber-forming thermoplastic materials. Certain polyamides, e.g., those based on polymerized fatty acids, also known as dimer acids, are useful as hot-melt adhesives (see D. E. Peerman in *Encyclopedia of Polymer Science and Technology*, Wiley, N.Y., 1969, Vol. 10, pp. 597-615). These polyamides in general are not useful as psa's, because they are not tacky at room temperature. Psa's may be prepared however, by blending polyamides with materials such as colophonium resins, N-substituted toluene-sulfonamides, or phthalate esters, as taught in U.S. Pat. No. 3,792,002.

Blends of polyamides and acid-containing olefin polymers are also known in the art and are useful as hot-melt adhesives or molding resins. U.S. Pat. Nos. 3,845,163 and 4,018,733 describe blends of polyamides with ethylene/acrylic acid or ethylene/methacrylic acid copolymers. Blending of minor amounts of normally non-tacky acrylic copolymers with condensation-based polymers to improve impact resistance of these thermoplastic polymers is taught in U.S. Pat. Nos. 4,167,505 and 4,395,518.

SUMMARY OF THE INVENTION

Briefly, this invention provides polymer blends of polyamides with polyacrylates. The polyamides useful in this invention are condensation-based polyamides, and surprisingly, can be blended with pressure sensitive acrylic polymers and copolymers to provide blends or homogeneous mixtures which can yield pressure sensitive adhesives, films, and articles such as pressure sensitive adhesive tapes.

Blends of pressure sensitive acrylic copolymers with condensation-based polyamides are heretofore not known in the art. Moreover, in "Polymer-Polymer Miscibility," O. Olabisi, L. M. Robeson and M. T. Shaw, Academic Press, N.Y., 1979, p. 245, it is stated that "miscible polymer systems involving polyamides . . . are quite rare."

As already noted, condensation-based thermoplastic polyamides are well known in the art and find use in hot melt adhesives. A shortcoming of these adhesives is that a thermoplastic molten adhesive requires a finite amount of time in which to cool sufficiently to display initial bond strength. This lack of instantaneous bond strength may preclude the use of such polyamides in certain high-speed or multi-step adherence operations.

On the other hand, pressure sensitive adhesives based on acrylic polymers display instantaneous bond strength and can be used in high-speed operations or multi-step adherence operations; however, they also often exhibit shortcomings such as poor cohesion, poor extrudability, and/or poor tack properties.

It has now been found that compatible (miscible) blends of condensation-based, normally non-tacky polyamides and normally tacky pressure sensitive acrylic copolymers can be prepared. These blends exhibit surprisingly improved cohesive strengths without being crosslinked and without significant decreases in either tack or adhesion. In fact, in many instances tack is substantially improved in the blends as compared to that of the acrylic copolymers themselves.

Polymer blends of the invention can be prepared by mixing solutions of polyamides with solutions of acrylic polymers, the components being present in any proportion. The blends after removal of solvent, as by heating, can be used as psa's. Pressure sensitive adhesive tapes can be prepared by coating the resultant blends on suitable, preferably flexible, polymeric substrates, although other substrates such as metals, paper, or glass can be used. Removal of the solvent provides pressure sensitive adhesive or tapes. Common organic solvents are useful in preparing these blends.

The background art has not taught the admixture of condensation-based polyamides with acrylic polymers; in fact it has taught away from this direction by indicating that one could not expect to obtain compatible blends. In contrast, it has now been discovered that solutions of condensation-based polyamides can be blended with solutions of pressure sensitive acrylic polymers to provide a mixture exhibiting increased cohesion without adversely affecting the other properties of the original psa.

In this application:

"blend" means a homogeneous mixture (either 100% solids or in solution) which cannot be separated by mechanical means.

DETAILED DESCRIPTION

The present invention provides a composition of matter comprising:
a blend comprising:
(1) at least one condensation-based polyamide, and
(2) at least one pressure sensitive acrylic polymer.

The polyamides useful in the present invention are condensation-based polyamides, that is, polyamides obtained from the reaction of polyamines with polyacids, or polyamides obtained by the reaction of monomers of polymers which have the requisite amine-acid functionality in the same monomer or polymer in a free or latent form such as lactams and amino acids. Preferably, the polyamides have number average molecular weights in the range of 5,000 to 40,000.

Those polyamides which are particularly useful in the present invention are those which incorporate polymerized fatty acids, preferably di- and tricarboxylic acids having 19 to 54 carbon atoms and their derivatives, commonly referred to as "dimer acids" (includes carboxy functional dimer acids and derivatives thereof, e.g., amine derivatives) in the art, along with the other diacids, diamines, lactams, or other polyamide-forming monomers used in their synthesis. "Polyamide-forming" herein means materials or compounds having functionality directly or indirectly capable of entering into a reaction which produces a polyamide, i.e., a polymer characterized as having within its structure at least some polyamide functionality of the formula

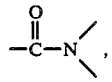

the functionality being connected with any of the various linking segments which may be used to connect the above described polyamide functionality. This definition is specifically meant to include species which form a polyamide while undergoing such reactions as ring opening, e.g., cyclic lactams; desterfication, e.g., carboxylic acid ester; dehydration, e.g., amino acids, and dehalogenation, e.g., organic acid chlorides. Other such polyamide progenitors will be obvious to one skilled in the art.

These polyamides are well-known in the art, being useful as hot-melt adhesives, printing ink resins, and surface coatings (see D. E. Peerman reference above). These polyamides are generally prepared by standard melt condensation techniques well known in the art from mixtures of the dimer acid derivative (e.g. dimer acid, dimer diamine), short chain diacids having 2 to 15 carbon atoms (e.g. adipic acid, sebacic acid, azelaic acid, terephthalic acid or their corresponding lower alkyl esters), short chain diamines having 2 to 15 carbon atoms (e.g. ethylenediamine, 1,6-hexanediamine, piperazine, triethylenetetramine), and/or aminoacids or lactams (e.g. $\epsilon$-caprolactam, 11-aminoundecanoic acid, lauryllactam). Additional modifying monomers such as polyether diamines may be used in the synthesis of the polyamides. Representative polyamides are disclosed in U.S. Pat. Nos. 2,886,543, 3,377,303, 3,449,273, 3,483,237, 3,622,604, 3,781,234, 4,055,525, 4,062,820, and 4,282,346 and British Pat. No. 1,319,807, which are incorporated herein by reference.

A class of these polyamides, preferred due to their excellent solubility in common organic solvents, are those disclosed in U.S. Pat. No. 4,218,351 which is incorporated herein by reference.

A particularly preferred class of polyamides comprises the copolymerization product of:
a. 57.5 to 94.75 mole percent, preferably 65 to 91.5 mole percent, short chain polyamide-forming species;
b. 5 to 30 mole percent, preferably 7.5 to 25 mole percent, polyamide-forming dimer acid;
c. 0.25 to 12.5 mole percent, preferably 1.0 to 10 mole percent, amorphous polyamide-forming oligomers having a number average molecular weight in the range of about 600 to about 10,000.

More preferably the resulting short chain polyamide moieties derived from a. of the particularly preferred class are one or more of

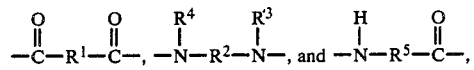

wherein $R^1$ and $R^2$ are aliphatic, cycloaliphatic or aromatic hydrocarbon radicals having from 1 to 15 carbon atoms, $R^3$ and $R^4$ are independently H or lower alkyl having from 1 to 4 carbon atoms or together form an alkylene group of 2 to 8 carbon atoms and are part of a heterocyclic ring incorporating the structure

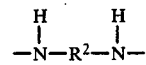

wherein $R^2$ is as defined above; more preferably the resultant polyamide dimer acid moieties derived from b. are one or both of

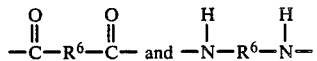

wherein $R^6$ is a dimerized polymeric fatty acid residue; and more preferably the resultant amorphous polyamide oligomer moieties derived from c. are one or both of

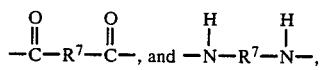

wherein $R^7$ is a linear or branched alkyl or polyether chain having a number average molecular weight in the range of about 600 to about 10,000.

Most preferably the polyamide useful in the present invention is the copolymerization product of:

a. short chain polyamide forming species sebacic acid and piperazine; azelaic acid and 1,6-hexanediamine; azelaic acid, adipic acid, and piperazine; caprolactam; caprolactam and piperazine;
b. dimeric fatty acids which are generally comprised of at least 80% by weight dimeric fatty acids, the remainder comprising monomeric starting materials, structurally altered monomers, trimeric and higher polymeric polyamide-forming fatty acids; and
c. an amorphous amide-forming oligomeric polyoxyalkylene diamine having a number average molecular weight in the range of about 900 to 5,000.

Normally tacky pressure sensitive acrylic copolymers useful for the purposes of this invention are also well-known in the art. These are typically prepared by solution or emulsion copolymerization of long chain ($C_4$ to $C_{16}$) alkyl acrylates with polar comonomers as described in U.S. Pat. Nos. 2,884,126 (e.g., those having inherent pressure sensitive adhesive properties are the polymers of the acrylate esters of acrylic acid with non-tertiary alkyl alcohols such as n-butanol, n-pentanol, isopentanol, 2-methyl butanol, 1-methyl butanol, 1-methyl pentanol, 2-methyl pentanol, 3-methyl pentanol, 2-ethyl butanol, 3-pentanol, 3,5,5-trimethylhexanol, 3-heptanol, isooctanol, n-decanol, dodecanol, and the like, as well as various copolymers thereof) and 3,008,850 (e.g., certain non-tertiary alkyl acrylates, among which is poly-n-butyl acrylate, copolymerized with small proportions of acrylic acid or other additive copolymerizable monomer having strongly polar groups). Also representative acrylic copolymers are those described in U.S. Pat. No. 4,157,418, in which N-acryloylamino acids are utilized as the polar comonomer. Preferred are copolymers of acrylic esters of non-tertiary alkyl alcohols having 4 to 12 carbon atoms, such as butyl acrylate, 2-methylbutyl acrylate, 2-ethylhexyl acrylate, and isooctyl acrylate, in which the polar comonomer is acrylic acid, methacrylic acid, acrylamide, or an N-acryloylamino acid such as N-acryloylglycine or N-acryloylaspartic acid. These acrylic polymers preferably have number average molecular weights in the range of 500,000 to 10,000,000.

The dimer acid based polyamides and the pressure sensitive acrylic polymers described in this invention appear to be compatible in all proportions. Although it is considered to be within the scope of the present invention to prepare composites having any ratio of the two polymers, e.g. 99.99:0.01 to 0.01:99.99 acrylic/polyamide by weight, the preparation of composites retaining pressure sensitive character in general requires the use of at least about 50% by weight acrylic polymer. Preferred weight ratios of acrylic/polyamide are in the range of 7:1 to 2:1. It has been found that while increasing the relative amount of polyamide in the composite leads to a corresponding increase in the cohesion of the resultant psa, a corresponding decrease in adhesion is also observed. Changes in tack generally do not show a regular variation with blend composition, but often tack in the blend is greater than in the acrylic psa alone. Thus, in designing a composite for a desired end use application, one needs simply to prepare a series of blends, evaluate tape properties, and then choose the blend which provides the best balance of cohesion, adhesion, and tack for that end use. Preferably, the psa blends of the instant invention have a glass transition temperature (Tg) of less than $-15°$ C. for adequate tack to be present.

The polyamide/acrylic blends of the present invention are most conveniently prepared by separately preparing solutions of the polyamides and the acrylic psa's in common organic solvents, and then simply mixing these two solutions to form the blend. These blends are miscible solutions. Optionally, additinal diluting solvents may be added to the initial blends to obtain solutions of the desired viscosity and/or concentration for coating purposes, as is well known in the art. A wide variety of organic solvents (generally those having up to 15 carbon atoms) can be utilized to prepare the solution blends and the composites of the invention.

With regard to the acrylic polymers, the solvents useful are those which are generally used for the solution polymerization of acrylic monomers as is well known in the art. These solvents include aromatic and aliphatic hydrocarbons such as toluene, xylene and heptane, ketones such as acetone, methyl ethyl ketone, and methyl isobutyl ketone, and esters such as ethyl acetate, as well as combinations of one or more of these solvents. With acrylic polymers which are prepared by emulsion polymerizations, these polymers may be coagulated, filtered, dried, and then dissolved in an appropriate solvent. In this event, or when diluting a solution-polymerized acrylic, other solvents such as tetrahydrofuran or chlorinated solvents such as chloroform or methylene chloride may be utilized.

Solvents which may be utilized with respect to the polyamides are limited by the solubility of the respective polyamides. While most dimer acid based polyamides are soluble in chlorinated solvents such as chloroform and methylene chloride, and blends can be made using such solutions, these are not particularly preferred because of the cost and associated toxicities of chlorinated solvents. For this reason, polyamides such as those disclosed in U.S. Pat. No. 4,218,351, which are soluble in alcohols such as ethanol, methanol, and isopropanol, or in mixtures of alcohols and aromatic hydrocarbons such as toluene and xylene, are preferred for the preparation of the solution blends. Surprisingly, it has been discovered that even addition of an ethanolic solution of a polyamide to a solution of an isooctyl acrylate-acrylic acid copolymer in ethyl acetate solution results in a homogeneous mixture, even though the polyamide is insoluble in ethyl acetate and the acrylic polymer is correspondingly insoluble in alcohol.

Concentrations of the separately prepared polyamide and acrylic polymer solutions may vary widely and are not critical to the invention. Generally it is preferred to make them as concentrated as possible, e.g., 5 to 50% solids by weight, preferably 10 to 40% solids by weight, so as to have the greatest latitude for adjusting concentration for coating purposes once the blend is made. Of course, initial concentration will depend upon solubilities, viscosities, and type of mixing equipment available for making the blends, as is well known in the art.

Mixing of the polyamide solution and the acrylic solution may be accomplished by any of the many techniques well known in the art. This might be as simple as pouring one solution into the other and mixing with a stirring rod or it may be accomplished using sophisticated mixing equipment such as Banbury TM mixers, static mixers, extruders, and impingement mixers. Optionally, heat may be applied during mixing to facilitate the mixing process and the formation of a homogeneous mixture.

Composite articles such as tapes can be prepared using the pressure sensitive adhesives of the present invention. Solution blends of the invention may be transformed into the psa's and tapes of this invention by coating (using methods well known in the art such as knife coating, bar coating, curtain coating, roll coating, and the like) the viscous solution containing the polyacrylate/polyamide blend onto a backing and removing the solvent, e.g., by heating. Thickness of the dry coating can vary from 0.01 to 10 mm or more depending on the nature of the intended use for the adhesive. The dry coating can be re-dissolved in organic solvents, showing the essentially noncrosslinked nature of these psa blends.

The tape backing may be of two kinds; permanent and non-permanent. A permanent backing is one in which the backing is desired to remain with the pressure-sensitive adhesive once it is bonded to the substrate. Useful permanent backings are metals such as aluminum, steel including various alloys, and copper, cloth, paper, polymeric films such as poly(ethylene terephthalate), poly(carbonates), poly(acrylates), poly(methacrylates), poly(olefins), and poly(cellulose acetates), and glass to include glass re-inforced composites. As is well known to one skilled in the art, various priming agents and coatings can be utilized to facilitate adhesion between the pressure-sensitive adhesive and the permanent backing.

A non-permanent backing is one in which the pressure-sensitive adhesive is intended to be only temporarily bonded thereto to facilitate transfer of the pressure-sensitive adhesive to a substrate. Once the pressure-sensitive adhesive has been transferred to the substrate, the non-permanent backing can be removed and another substrate can be bonded to the original substrate via the pressure-sensitive adhesive. Useful non-permanent backings include paper or polymeric films that have been surface-coated with various release coatings that are well known in the art such as silicone coatings that facilitate the transfer of the pressure-sensitive adhesive.

There are three tests with which adhesives and adhesive articles such as tapes of this invention are concerned; tape adhesion test, tape cohesion test, and tape tack test. These tape tests are described as follows:

For the tape testing procedures, polymer blend solutions were knife coated onto a suitable substrate such as polyester film (0.05 mm) and dried in an air-circulating oven at 88° C. for 10 minutes so as to obtain a dry coating weight of adhesive of about 65 g/m². The tape tests were evaluated at 21° C. and 50% relative humidity and are described below:

Tape Adhesion Test

A standard procedure (Interim Federal Test Method Standard No. 147, Mar. 12, 1963) for recording 180° peel adhesion was modified as follows:
1. The polyester film utilized as the tape backing was 0.05 mm in thickness.
2. The peeling rate was about 3.8 cm/sec.
3. Glass was used as the substrate instead of stainless steel.

The adhesion to glass reported in the Examples was the average of the range of numbers observed for three trials.

Tape Cohesion Test

The cohesive strengths of the adhesives were compared by means of a standard shear strength test (Interim Federal Test Method Standard No. 147, Mar. 12, 1963). Unless otherwise specified a 1000 g load was suspended from an adhesive contact area of 1.6 cm² for the measurement. The time required for the tape to separate from the steel plate was measured and recorded in minutes as the average of three trials. In all cases the mode of failure was cohesive in that approximately equal amounts of adhesive remained visible on both steel and polyester surfaces.

Tape Tack Test

The tack measurements were made using a Polyken TM Probe Tack Tester (Kendall Co., Boston, MA). The test sample was applied backing side down to a double coated tape (3M Brand No. 665), which in turn was adhered to a small glass coverslide. This apparatus was then adhered, test sample adhesive down, to one end of a brass cylinder weighing 20 g. The rodlike stainless steel probe (contact area of 0.02 cm²) was then brought into contact with the test adhesive in the brass cylinder so that the cylinder was raised and supported by the probe. (The effective pressure forcing the adhesive and the probe into contact was about 1000 g/cm²). The cylinder was suspended for 5 sec., and then the probe was withdrawn at a velocity of 1 cm/sec. The maximum force required for removal was measured and recorded. Nine runs were performed for each of the adhesives because of the range of values observed. The highest and lowest values were discarded, and the remaining seven values were averaged.

The psa's of the present invention can be used as adhesives, as adhesive articles, and in composites such as psa tapes.

In the following non-limiting examples, all monomers, catalysts, and solvents were used as obtained commercially without purification or removal of inhibitors. Acrylic copolymer solutions were prepared by conventional solution polymerization techniques as described in U.S. Pat. No. 2,884,126 unless noted otherwise and diluted to the stated concentration prior to blending. Polyamides were prepared according to the teachings of U.S. Pat. No. 4,218,351. Quantities used are listed as molar parts unless otherwise indicated.

Objects and advantages of this invention are further illustrated by the following examples, but the particular materials and amounts thereof recited in these examples, as well as other conditions and details, should not be construed to unduly limit this invention. Unless otherwise stated, all tapes were prepared using 0.05 mm thick polyester film as backing and the psa was knife coated thereon at a dry coating weight of about 65 g/m².

EXAMPLE 1

The following examples compare the properties of a typical acrylic copolymer-coated tape (comparison sample A) with those tapes containing blends of polyacrylates with polyamides (samples 1–5).

A polyamide designated Polyamide I prepared from azelaic acid (27.5 parts), adipic acid (10 parts), Hystrene TM 3695 (12.5 parts, a dicarboxylic acid acid comprised of 95% by weight 36 carbon atom dimer commercially available from Humko-Sheffield Chemical Co., Memphis, TN), piperazine (49 parts), and Jeffamine TM D-2000 (1 part, a polyoxypropylene diamine having a molecular weight of approximately 2000, commercially available from Texaco Chemical Co., Bellaire, TX) according to the teachings of U.S. Pat. No. 4,218,351, was dissolved in ethanol at 33% solids by weight. An acrylic copolymer (comparison sample A) was prepared from isooctyl acrylate (89 parts) and acrylic acid (11 parts) and diluted to 15% solids in ethyl acetate. Blends of the two solutions were then made so as to give the corresponding weight/weight ratios of the two polymers as listed in Table 1 (samples 1–5) with additional diluting solvent being added to give good coating solutions prior to tape preparation. A good coating solution implies clarity and suitable viscosity as practiced by those skilled in the art. Tapes were prepared and properties of the resultant tapes were measured according to the tape tests described above. For comparison purposes, the properties of a tape prepared from the above acrylic copolymer alone (comparison sample A) were also evaluated.

TABLE I

Properties of Tapes Using Polyamide I

| | Polymer | | Tape | | |
|---|---|---|---|---|---|
| Sample | Acrylic copolymer/ Polyamide (w/w ratio) | Diluting solvent | Cohesion (min) | Tack (g) | Adhesion (g/cm) |
| 1 | 1:1 | toluene | 300 | 217 | shocky* |
| 2 | 2:1 | EtOAc/EtOH** (1:2 w/w) | 508 | 222 | 413 |
| 3 | 3:1 | EtOAc/EtOH (1:1 w/w) | 344 | 246 | 524 |
| 4 | 5:1 | EtOH/toluene (9:1 w/w) | 245 | 266 | 513 |
| 5 | 7:1 | EtOH/toluene (9:1 w/w) | 178 | 288 | 580 |
| A | — | — | 58 | 202 | 803 |

*"shocky" indicates a jerky or slip-stick type of peeling behavior (see Aubrey, op. cit., pp 138–140)
**EtOAc is ethyl acetate; EtOH is ethyl alcohol Data of Table I show that tapes prepared from the polymer blends (samples 1–5) exhibited better cohesion and tack properties than comparison sample A, while still maintaining sufficient adhesion to be useful as psa's.

Samples 1 to 5 can be useful in different applications. For example, Sample 2 can be a useful adhesive in an end use application in which the adhesive joint is subjected to high shear stress and lesser peeling forces. Sample 5 would be useful under conditions of high peel stress but still requiring higher shear holding power than the unmodified psa (Sample A) itself.

The following Examples illustrate the preparation of blends useful as psa's from other polyamides and other acrylic copolymers.

EXAMPLE 2

Comparison of a typical acrylic copolymer-containing tape (comparison sample B) with tapes containing blends of polyacrylates with polyamides (samples 6 and 7)

A polyamide designated Polyamide II, prepared from sebacic acid (50 parts), piperazine (37.5 parts), Kemamine TM DP-3680 (10 parts, a dimer diamine comprised of 80% by weight of a 36 carbon atom dimer, commercially available from Humko-Sheffield Chemical Co., Memphis, TN), and Jeffamine TM D-2000 (2.5 parts, a polyoxypropylene diamine having a molecular weight of approximately 2000, Jefferson Chemcial Co., Inc., a subsidiary of Texaco Chemical Co., Bellaire, TX) was dissolved in ethanol at 11% solids by weight. An acrylate copolymer (comparison sample B) was prepared from isooctyl acrylate (78 parts) and acrylic acid (22 parts) in ethyl acetate and diluted to 22% solids by weight. Blends were then made of the two solutions so as to give the corresponding weight/weight ratios of the two polymers as listed in Table II (samples 6 and 7). Tapes were prepared and properties of the resultant tapes were measured according to the tape tests described above. For comparison purposes, the properties of a tape prepared from an acrylic copolymer were also evaluated (comparison sample B). The data of Table II show that tapes prepared from polymer blends (sample 6 and 7) exhibited better cohesion and tack properties than those of comparison sample B while maintaining sufficient adhesion to be useful as pressure sensitive adhesives.

TABLE II

Properties of Tapes Using Polyamide II

| Sample | Acrylic Copolymer/ Polyamide (w/w ratio) | Cohesion (min) | Tack (g) | Adhesion (g/cm) |
|---|---|---|---|---|
| 6 | 3:1 | 794 | 168 | shocky* |
| 7 | 5:1 | 529 | 348 | 914 |
| B** | — | 305 | 216 | 1059 |

*shocky indicates a jerky or slip-stick type of peel behavior (see Aubrey, op cit. pp 139–140); instrument registers no stable value
**comparison sample

EXAMPLE 3

A polyamide designated Polyamide III was prepared from ε-caprolactam (85 parts), Hystrene 3695 (7.5 parts), piperazine (5 parts) and Jeffamine D-2000 (2.5 parts) and dissolved in ethanol/toluene (9:1 w/w) at 11% solids by weight. This solution was blended with the acrylic copolymer solution prepared as in Example 1 in such proportions as to give a 5:1 acrylic/polyamide weight ratio and diluted to 14.7% solids with ethyl acetate prior to coating. The finished tape displayed the following properties:
cohesion (min): 467
tack (g): 384
adhesion (g/cm): shocky (See Example 2 for definition)

EXAMPLE 4

A polyamide designated Polyamide IV was prepared from azelaic acid (32.5 parts), adipic acid (7.5 parts), Hystrene 3695 (10 parts), piperazine (49 parts) and Jeffamine D-2000 (1 part) and dissolved in ethanol/toluene (9:1 w/w) at 11% solids by weight. Blends were made with the acrylic copolymer solution used in Example 1 and diluted to 14.7% solids with 9:1 ethanol/toluene prior to coating to provide sample 8 and 9 (Table III).

TABLE III

Properties of Tapes Using Polyamide IV

| Sample | Acrylic copolymer/ Polyamide (w/w) | Cohesion (min) |
|---|---|---|
| 8 | 3:1 | 1524 |
| 9 | 5:1 | 2320 |

EXAMPLE 5

An acrylic copolymer solution (comparison sample C) was prepared from isooctyl acrylate (78 parts) and acrylic acid (22 parts) utilizing potassium peroxydisulfate/18 crown-6 as the initiator (Example 14 of U.S. Pat. No. 4,326,049) and diluted to 25% solids in acetone. A tape prepared from this acrylic copolymer was designated comparison sample C.

To 20 g of this solution was added 11.36 g of the Polyamide III solution of Example 3 and 5 g of ethyl acetate was added to the resultant mixture to produce a 15% solids solution (acrylic/polyamide, 4:1 w/w). A tape was prepared using the acrylic/polyamide blend as psa and is designated sample 10. Tape properties are listed in Table IV.

TABLE IV

Properties of Tapes Using Polyamide III

| Sample | Acrylic copolymer/ Polyamide (w/w) | Cohesion (min) |
|---|---|---|
| 10 | 4:1 | 164 |
| Comparison C | — | 29 |

EXAMPLE 6

An acrylic copolymer soluton (prepared as a tape and designated comparison sample D) was prepared according to the teachings of U.S. Pat. No. 4,157,418 from isooctyl acrylate (86 parts) and N-acryloylglycine (14 parts) at 38.4% solids in acetone. A polyamide solution designated Polyamide V was prepared from azelaic acid (27.5 parts), adipic acid (10 parts), Hystrene 3695 (12.5 parts), piperazine (49 parts), Jeffamine D-2000 (1 part) and stearic acid (0.75 parts) according to the teachings of U.S. Pat. No. 4,218,351 and dissolved in ethanol/toluene (3:2 w/w) at 30% solids. A blend was prepared containing 5:1 w/w acrylic/polyamide by mixing 19.53 g acrylic solution with 5 g. polyamide solution and diluting to 25% solids with 3:2 (w/w) ethanol/toluene prior to tape preparation. A tape was prepared using the acrylic/polyamide blend and was designated sample 11. Results are reported in TABLE V.

TABLE V

Properties of Tapes Using Polyamide IV

| Sample | Cohesion (min) |
|---|---|
| 11 | 787 |
| Comparison D | 124 |

Data of Examples 3 to 6 demonstrate dramatic improvements in psa cohesion can be obtained upon blending polyamides with acrylic psa's.

EXAMPLE 7

To gain more information on polymer/polymer miscibility in the blends, several blends with the acrylic copolymer of Example 2 were coated on a base polypropylene film at a dry coating weight of 65 g/m² and air dried. The resultant dried composite films were then peeled from the base polypropylene film and analyzed for glass transition temperature (Tg) and melt transition temperature (Tm) with a DuPont (Wilmington, DE) differential thermal analyzer, model 900, with programmed heating and cooling rates of 30° C./min. Results are listed in TABLE VI below.

TABLE VI

DTA Analysis of Acrylic Copolymer/Polyamide Blends

| Sample | Polyamide | Acrylic Copolymer/ Polyamide (w/w) | Tg (°C.) | Tm (°C.) |
|---|---|---|---|---|
| 12 | II | — | −58 | +132 |
| 13 | II | 1:4 | −54 | +125 |
| 14 | II | 1:2 | −56 | +128 |
| 15 | II | 1:1 | −48 | +129 (broad) |
| 16 | II | 3:1 | −42 | * |
| B** | — | — | −39 | * |
| 17 | IV | — | 0 | * |
| 18 | IV | 3:1 | −40 (broad) | * |
| 19 | IV | 5:1 | −39 (broad) | * |

*no definite Tm observed
**comparison sample - see Example 2

Data of TABLE VI show that the gradual increase in Tg in the series samples 12-16 (see TABLE VI) provides a reasonable indication of polymer/polymer miscibility. With samples 18 and 19, the broadened nature of the transition was indicative of at least intermediate behavior between complete miscibility and immiscibility. The clarity in the films of these latter blends also indicated compatibility of the two components.

EXAMPLE 8

Eleven percent solids solutions in chloroform were prepared from each of the following commercial dimer acid based polyamide resins (Henkel, Minneapolis, MN): (a) Versamide TM 940; (b) Versalon TM 1139; (c) Versalon TM 1300. Each of these solutions could be mixed with the acrylic polymer solution of Example 2 to form clear, homogeneous blends.

EXAMPLE 9

An acrylic copolymer having the same composition as that of Example 1 was converted to a 100% solids form by evaporation of the solvent. Polyamide V (120 g) and this acrylic copolymer (706 g) were freeze-ground separately (particle size about 1 to 5 mm) and then mixed together. This mixture was then intimately blended by passage through a 34 mmm Leistritz TM counterrotating twin screw extruder (American Leistritz Corp., Newport Beach, Calif.) at 160° C., 14 rpm. The resultant homogeneous blend (6.3:1 acrylic/polyamide w/w) was extruded as a solid psa in rope form. Alternatively, a coating die or a mold could be attached at the exit port of the extruder so that the blend could be directly coated as a thin layer upon a desired substrate.

Various modifications and alterations of this invention will become apparent to those skilled in the art without departing from the scope and spirit of this invention, and it should be understood that this invention is not to be unduly limited to the illustrative embodiments set forth herein.

What is claimed is:
1. An article comprising:
   (a) a substrate, and
   (b) coated on at least one surface thereof a composition comprising a blend comprising
      (1) at least one condensation-based polyamide prepared by reaction of stoichiometric amounts of acid and amine functionality, and
      (2) at least one pressure sensitive acrylic polymer, the ratio by weight of the acrylic and polyamide polymers being 99.99:0.01 to 0.01:99.99, said blend being only organic solvent soluble and said blend being an uncrosslinked pressure sensitive adhesive.

2. The article according to claim 1 wherein said composition comprises at least 50% by weight acrylic polymer.

3. The article according to claim 1 wherein said polyamide comprises the copolymerization product of:
 (a) 57.5 to 94.75 mole percent short chain polyamide-forming species;
 (b) 5 to 30 mole percent polyamide-forming dimer acid;
 (c) 0.25 to 12.5 mole percent amorphous polyamide forming oligomers having a number average molecular weight in the range of about 600 to about 10,000; and
said acrylic polymer comprises the copolymerization product of:
 (a) isooctyl acrylate and
 (b) acrylic acid.

4. The article according to claim 1 which is a pressure sensitive adhesive tape.

5. A process for preparing a pressure sensitive adhesive tape comprising the steps of:
 (a) providing a substrate,
 (b) coating at least one surface of said substrate with a composition comprising a blend comprising:
  (1) at least one condensation-based polyamide prepared by reaction of stoichiometric amounts of acid and amine functionality, and
  (2) at least one pressure-sensitive acrylic polymer, the ratio by weight of the acrylic and polyamide polymers being 99.99:0.01 to 0.01:99.99,
  (3) at least one organic solvent,
   said blend being only organic solvent soluble,
 (c) removing said solvent from the resultant coating to provide said pressure-sensitive adhesive tape.

6. The process according to claim 5 wherein said polyamide comprises the copolymerization product of:
 (a) 57.5 to 94.75 mole percent short chain polyamide-forming species;
 (b) 5 to 30 mole percent polyamide-forming dimer acid;
 (c) 0.25 to 12.5 mole percent amorphous polyamide forming oligomers having a number average molecular weight in the range of about 600 to about 10,000; and
said acrylic polymer comprises the copolymerization product of:
 (a) isooctyl acrylate and
 (b) acrylic acid.

7. A process for preparing an article comprising the steps of:
 (a) providing a blend comprising
  (1) at least one condensation-based polyamide prepared by reaction of stoichiometric amounts of acid and amine functionalty
  (2) at least one pressure sensitive acrylic polymer, the ratio by weight of the acrylic and polyamide polymers being 99.99:0.01 to 0.01:99.99,
  said blend being only organic solvent soluble and said blend being an uncrosslinked pressure sensitive adhesive, and
 (b) causing said blend to go into or through a die to provide said article.

* * * * *

UNITED STATES PATENT AND TRADEMARK OFFICE
CERTIFICATE OF CORRECTION

PATENT NO. : 4,769,285

DATED : September 6, 1988

INVENTOR(S) : Jerald K. Rasmussen

It is certified that error appears in the above-identified patent and that said Letters Patent is hereby corrected as shown below:

Col. 6, line 16, delete "additinal" and insert therefor -- additional --.

Col. 12, line 44, delete "34 mmm" and insert therefor -- 34 mm --.

Signed and Sealed this

Twentieth Day of June, 1989

Attest:

DONALD J. QUIGG

*Attesting Officer*  *Commissioner of Patents and Trademarks*